(12) United States Patent
Stuhlmacher (10) Patent No.: US 6,193,078 B1
(45) Date of Patent: Feb. 27, 2001

(54) MOTORCYCLE REPAIR RACK

(76) Inventor: Randel Stuhlmacher, 115 Camino Encanto, Danville, CA (US) 94526

(*) Notice: Subject to any disclaimer, the term of this patent is extended or adjusted under 35 U.S.C. 154(b) by 0 days.

(21) Appl. No.: 09/489,423

(22) Filed: Jan. 21, 2000

(51) Int. Cl.$^7$ .................................................. A47F 5/00
(52) U.S. Cl. ........................ 211/20; 211/22; 248/176.1; 254/88
(58) Field of Search ................................ 211/20, 22, 17; 248/176.1; 280/293; 254/88

(56) References Cited

U.S. PATENT DOCUMENTS

| | | |
|---|---|---|
| 4,073,505 | 2/1978 | Yamazaki et al. .................... 280/301 |
| 4,324,384 * | 4/1982 | Elser . |
| 4,420,164 * | 12/1983 | Mitchell ................................ 280/293 |
| 4,531,712 * | 7/1985 | Christian et al. . |
| 4,662,617 * | 5/1987 | Ditterline et al. .................. 211/17 X |
| 4,723,756 * | 2/1988 | Stumpf . |
| 5,562,215 * | 10/1996 | Blakey et al. .......................... 211/17 |
| 5,639,067 | 6/1997 | Johnson ................................ 254/131 |
| 5,857,230 | 1/1999 | Dowdy ..................................... 5/118 |
| 5,988,402 * | 11/1999 | Mayfield ................................ 211/20 |

OTHER PUBLICATIONS

Thunder Press, Dec. 1999 p. 103, Scotts Valley, Ca.

* cited by examiner

Primary Examiner—Robert W. Gibson, Jr.
(74) Attorney, Agent, or Firm—Robert Samuel Smith (57) ABSTRACT

A rack for supporting a motorcycle at a convenient height by a support under each wheel so that the space between the wheels and under the seat are accessible for servicing/repairing otherwise hard to reach parts. The rack section under the front wheel includes a platform horizontally supported on legs. The support surface has a pair of walls, formed in one embodiment by a pair of angle brackets adjustably spaced from one another and a stop wall, perpendicular to the angle brackets and positioned to prevent the motor cycle from rolling off the rack. Tie down straps fasten the motorcycle to the rack for further stabilization.

25 Claims, 7 Drawing Sheets

Step 1 Position lift and elevate motorcycle

Step 2 Position stand under front wheel

Step 3 Position stand under rear wheel

Step 4 Position angle braces and tighten

Step 5 Remove lift repair motorcycle

MOTORCYCLE REPAIR RACK

FIELD OF THE INVENTION

This invention relates to devices for supporting motor cycles during repair or service procedures and particularly to a rack that supports the motorcycle in a locked elevated position that provides convenient access to a mechanic to locations on the motorcycle such as oil drains and parts that are otherwise difficult to access.

The typical motorcycle periodically requires well known maintenance procedures such as scheduled maintenance or repair operations. A number of these procedures are difficult to perform because access to fittings and parts such as drain plugs are located on the underside of the chassis. The mechanic is required to kneel or lie down and reach under the motorcycle in positions that are awkward and uncomfortable. The kickstand used to support the motor cycle in an upright position is often in the way or unreliable to maintain the motor cycle in an upright position.

U.S. Pat. No. 5,857,230 discloses a hammock and jack which lifts the rear wheels but does not provide the accessibility of the present invention.

U.S. Pat. No. 5,639,067 to Johnson discloses a stand including a pivotable rotating support surface that is positionable beneath the frame of the motorcycle near the front or rear wheel for lifting the rear or front wheel off the ground for servicing.

U.S. Pat. No. 4,073,305 to Yamazaki discloses a stand device for a two wheel motorcycle which enables the motorcycle to be positively supported by the motorcycle stand disposed in an operative position in which the stand tilts forwardly as the motorcycle remains stationary and rests against the stand and automatically moves the stand from its operative position to its neutral position when the motor cycle is brought to an upright position.

Numerous motorcycle lifts are available for elevating the motor cycle to a level that is more convenient for working on the motor cycle. These lifts are typically scissors jacks that are mechanically, hydraulically or electrically actuated. The lift is rolled or slid under the chassis between the front and rear wheels so that, when power is applied to the lift, the lift comes up under the central region of the frame and elevates the motorcycle.

See, for example, the Easyroller™ Lift disclosed in "Thunder Press" Scotts Valley, Calif., Dec. 1999, page 103.

The problem with this arrangement is that the lift itself obstructs the mechanics total access to the underside of the chassis and frequently interferes with the mechanics job of dismantling some parts.

In another arrangement, a ramp is mounted on a scissors lift and the motorcycle is rolled up on the ramp. The lift is then actuated to elevate the motorcycle to a higher location. This arrangement is also characterized by the problem that the ramp extending between the front and rear wheels interferes with complete access to the parts targeted for service or replacement. Furthermore, rolling the heavy motorcycle up onto a ramp requires more strength than some motorcyclists can exert.

SUMMARY OF THE INVENTION

It is an object of this invention to provide a method and device for supporting an elevated motorcycle such as to provide complete freedom of access to a mechanic required to service the motor and chassis between the wheels.

According to the method of this invention, the motorcycle is elevated by a jack that is placed under the frame between the wheels. The motorcycle is then elevated to the desired height. One stand of this invention is then positioned under the front wheel another stand of this invention positioned under the rear wheel. The jack is then released so that the motorcycle is lowered to rest on the stands. A wheel clamp on either wheel is then adjusted to secure the motorcycle in an upright position. The clamp is adjustable to accommodate variations in the width of the wheel. One or more straps are provided extending between the handlebar or frame and at least one stand to further stabilize the motorcycle in its elevated position.

In one embodiment, each stand is a metal construction, fashioned, for example from metal tube sections. In another embodiment, either one or both stands are a plastic construction amenable to manufacture by extruded plastic processes.

DESCRIPTION OF PREFERRED EMBODIMENTS

Figure 1:
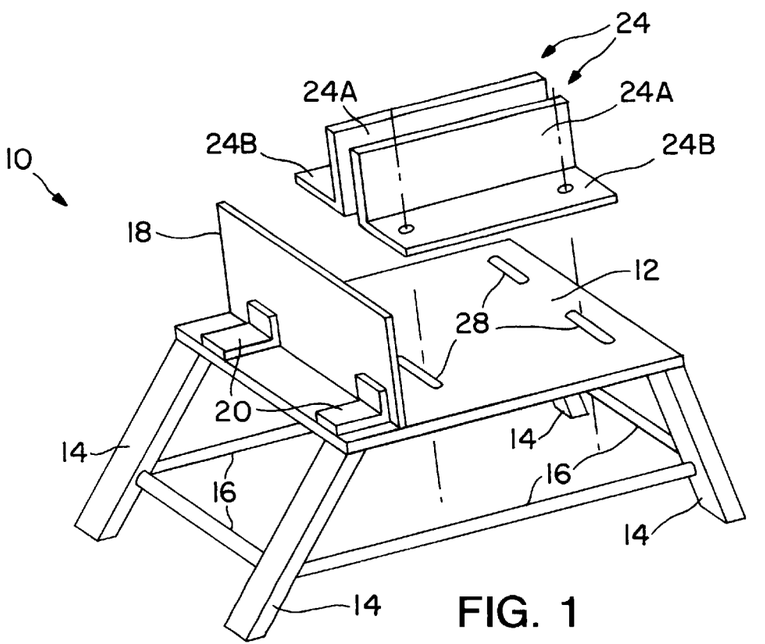
FIG. 1 shows an exploded view of the stand of this invention.
Figure 2:
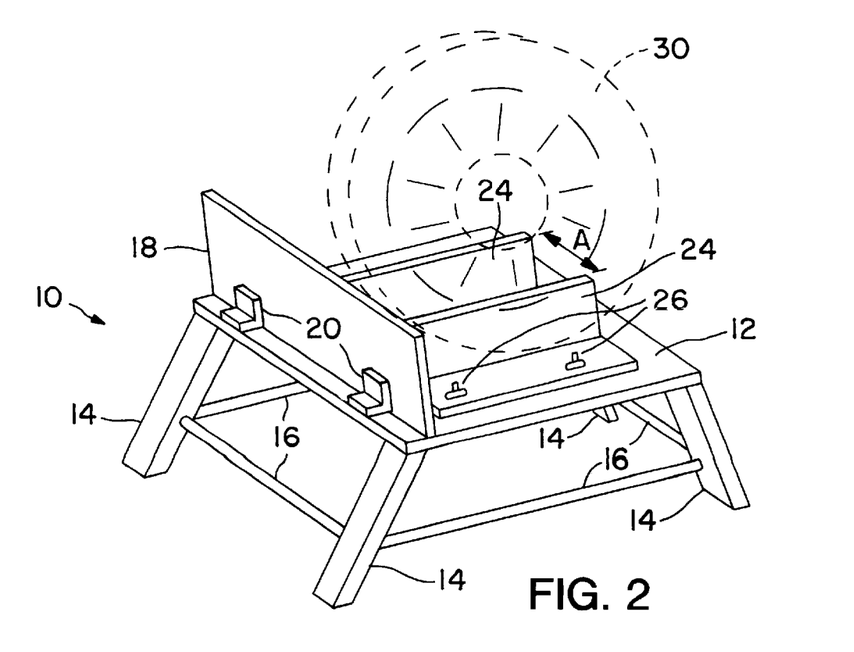
FIG. 2 is an assembly view of FIG. 1.

Turning now to a discussion of the drawings, FIG. 1 is an exploded view and FIG. 2 is a perspective assembly view of the motor cycle stand 10 of this invention for supporting a motorcycle in an elevated position. FIG. 2 shows a motorcycle wheel 30 in phantom supported on platform 12.

There is shown a platform 12 with support surfaces supported horizontally by four legs 14. Braces 16 are shown extending between the legs 14. A stop wall 18 is shown being a panel secured obliquely to platform 12 by brackets 20. A pair of angle braces 22, each comprising a panel 24A joined perpendicularly to panel 24B are shown poised for slidably securing to platform 12 by fasteners 26 that extend through panels 24B and through slots 28 (four are shown in FIG. 1) in platform 12. The slots 28 permit sliding the angle braces toward one another and securing in a position where the wheel 30 is clamped between the angle braces 24 and further secured by abutment against top plate 18.

The height of the support surface of the platform 12 above a base surface (ground) is preferably selected to maintain a desirable height for maintenance and repairs. This is typically in a range between six to twenty inches.

Figure 3:
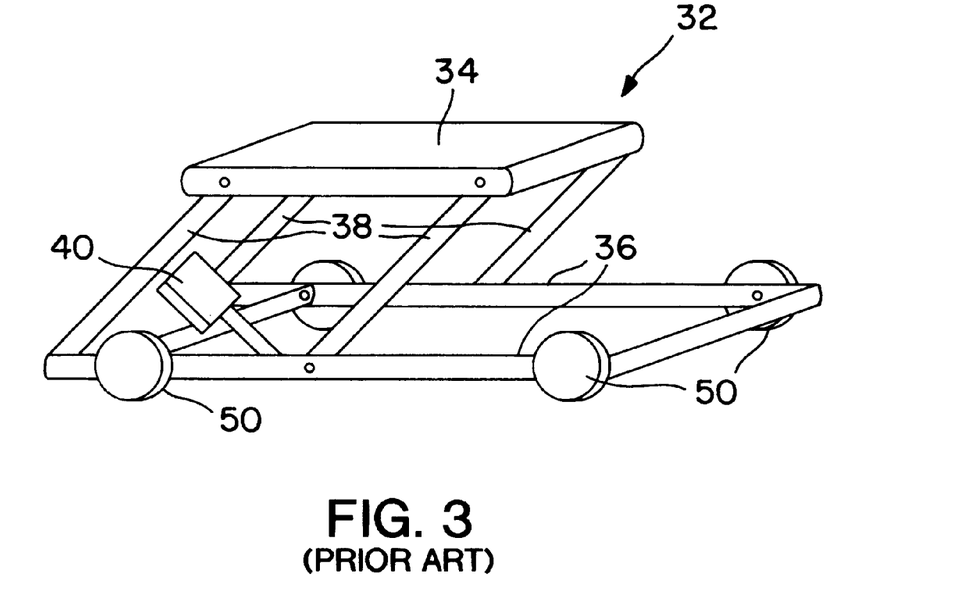
FIG. 3 shows a lift according to the prior art.

FIG. 3 shows a lift 32 (prior art) used in conjunction with the stand 10 of this invention. The lift 32 is any one of the types discussed in the background of this specification but is shown in FIG. 3 to be hydraulically actuated. The lift 32 comprises a lift platform 34 and a base frame 36 hingably secured by folding legs 38. The lift platform 34 is raised/lowered by a actuating a hydraulic cylinder 40 mounted between folding legs 38 and base frame 36. The base frame 36 is supported on casters 50 (wheels) for positioning the lift as required.

Figure 4:
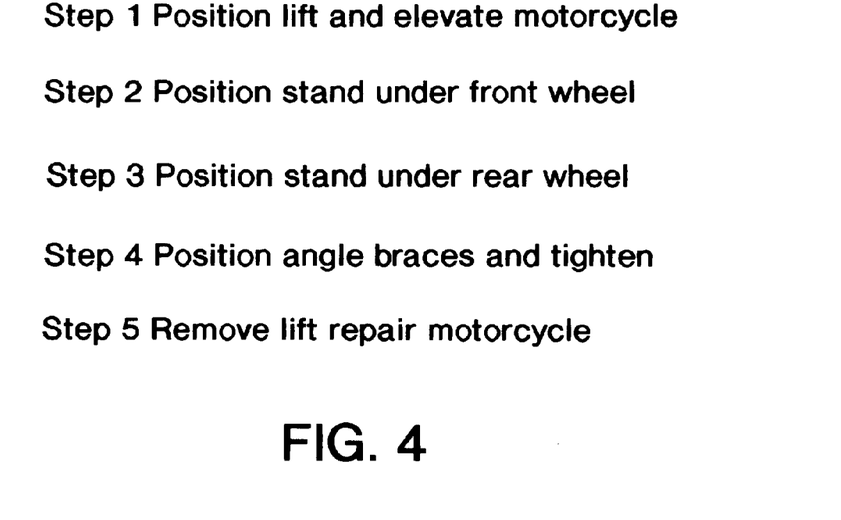
FIG. 4 is a flow chart of the method of practicing the invention.
Figure 5:
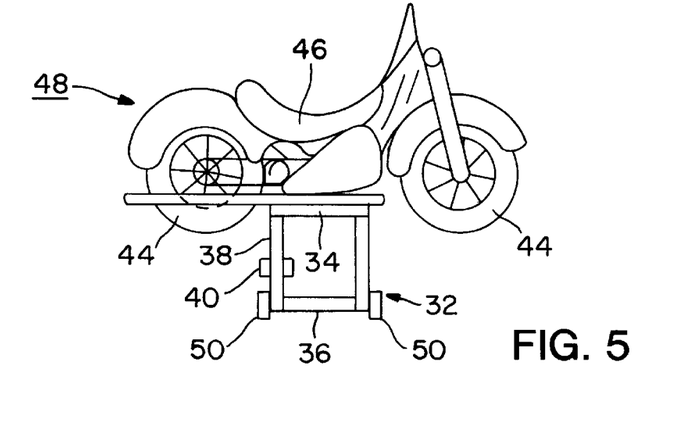
FIG. 5 shows the motorcycle lifted by the lift of FIG. 3.
Figure 6:
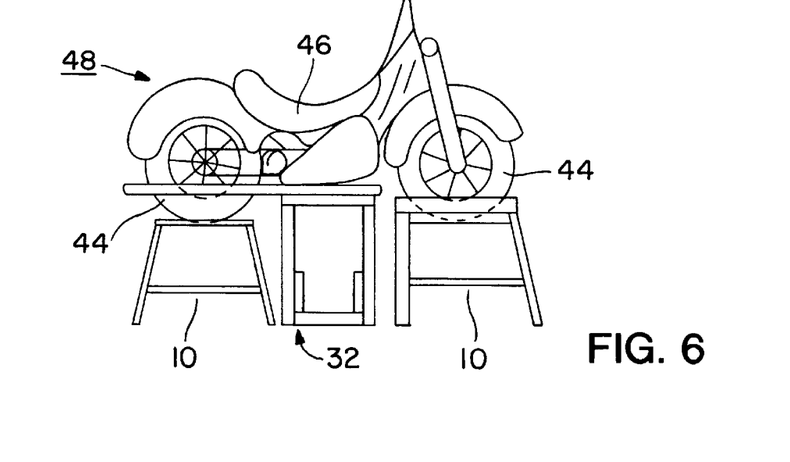
FIG. 6 shows positioning of the stands under the elevated motorcycle.
Figure 7:
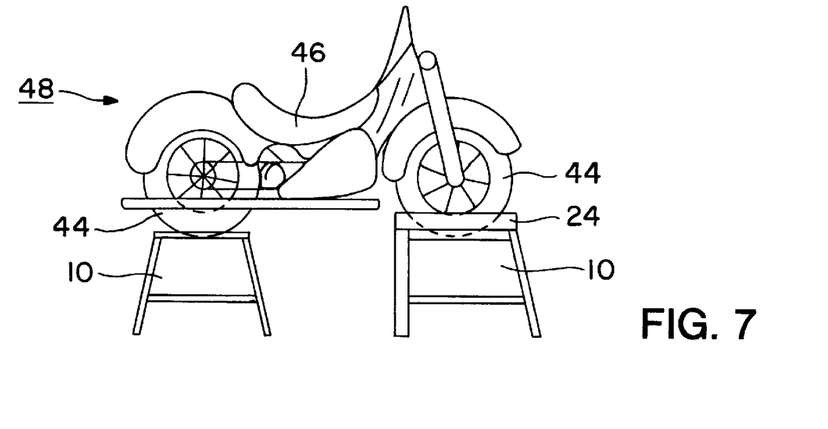
FIG. 7 shows removing the lift leaving the two stands to support the motorcycle.

FIG. 4 lists the steps and FIGS. 5, 6 and 7 show the steps which illustrate the method of practicing the invention whose object is to support the motor cycle 48 in a conveniently elevated position such that access to the region of the motorcycle between the wheels 44 and under seat 46 is unobstructed for servicing and repair operations. Such operations would include changing the oil, removing the gas tank, removing and repairing the motor and attachments such as the chain, etc., In step 1, (FIG. 5) the lift 32 is rolled under the motor cycle 48 between the wheels 44 and the motorcycle 48 is raised to the desired height by operating hydraulic lift 40.

In step 2, (FIG. 6.) a stand of this invention is positioned preferably under the front wheel of the motor cycle In step 3 (FIG. 6) a second stand is positioned under the rear wheel of the motor cycle.

In step 4, the angle braces on either/both the front or rear stands are moved snugly against the front or rear wheels respectively. (See arrow A illustrating slidably moving the angles 24.) The fasteners 26 are tightened to secure the respective wheel. Generally, angle braces on the front stand is adequate for securing the motor cycle in the upright position although the angle braces on both wheels is an added precaution.

In step 5. (FIG. 7.) the lift 32 is removed thereby clearing the area between the wheels for access by the mechanic.

After the repair operations are completed, the motorcycle is returned back to the ground by repositioning the lift and lifting the motorcycle off the stands, removing the stands 10, and then actuating the lift 32 to return the motorcycle back 48 on the ground.

The embodiment shown in FIGS. 1, 2, 5–7 is preferably a welded steel construction.

Figure 8:
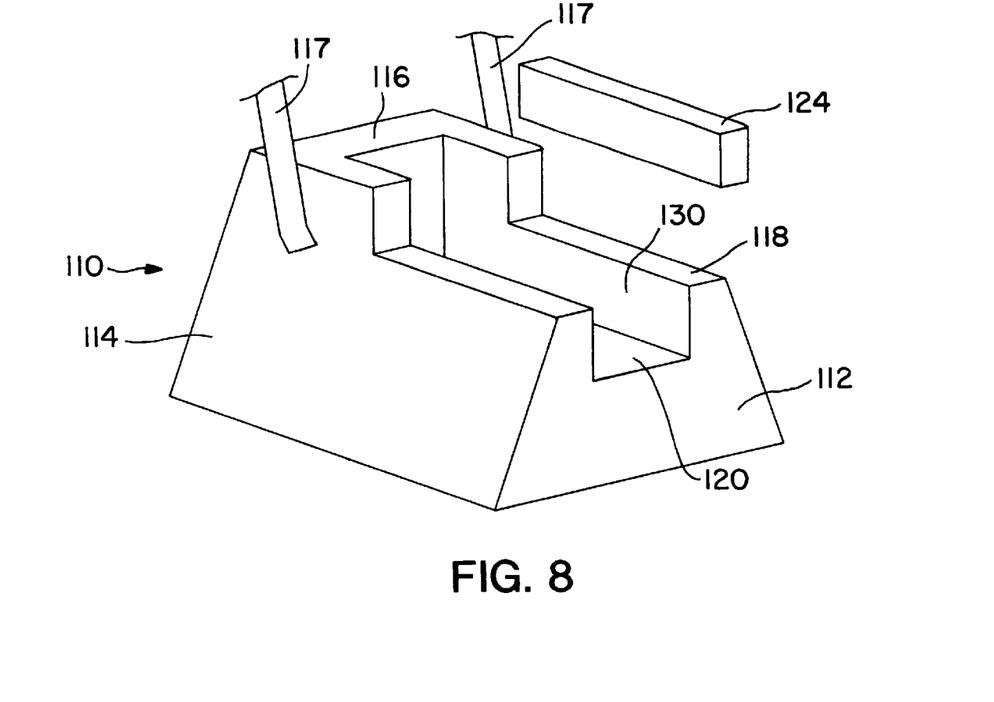
FIG. 8 shows another embodiment of stand utilizing plastic panel construction.
Figure 9:
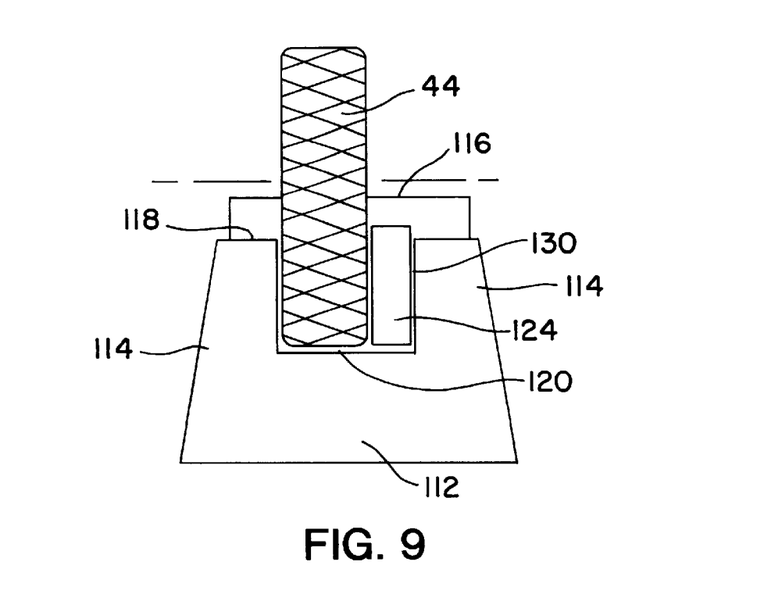
FIG. 9 shows an end view of FIG. 8 with a wheel in place.
Figure 10:
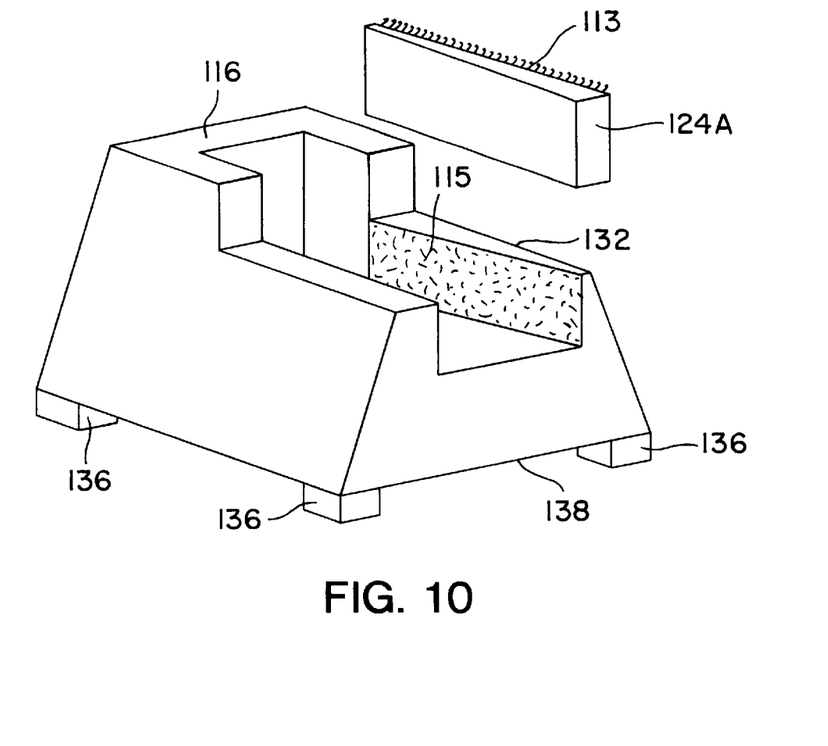
FIG. 10 shows a variation of FIG. 9.

FIGS. 8 and 9 show another embodiment of the stand of this invention which is a plastic panel (box like) construction preferably injection molded. The stand 110 comprises four substantially vertical sides (two sides, 112 and 114, are shown in FIG. 8.) The top side has a high step 116, a median step, and a low step 120. The low step 120 supports the motor cycle wheel 44. The intermediate step 118 provides (together with low step 120) a cavity that supports the motorcycle wheel 44 as shown in the end view of FIG. 9. The high step 116 provides a back stop that prevents the motor cycle from rolling off the stand. An insert 124 (e.g., a wooden block) is forced into the space between the interior wall 130 and the tire 44 as shown in FIG. 10 in order to secure the wheel on the stand. Various thicknesses of insert 124 are provided in order to accommodate various widths of the wheel 44.

Figure 11:
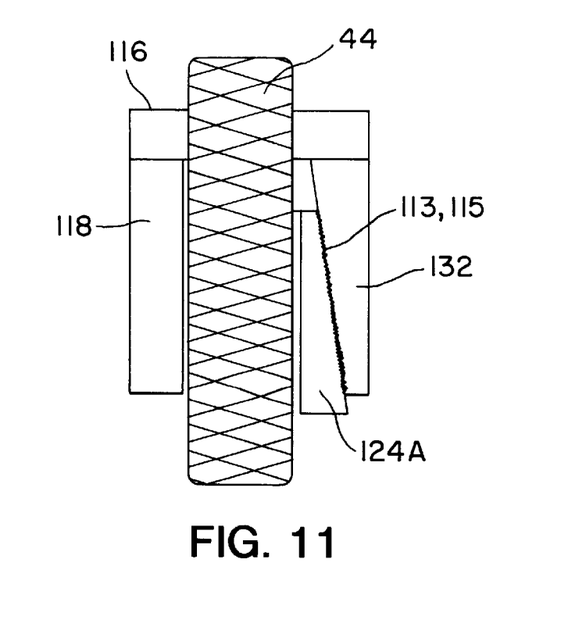
FIG. 11 shows an end view of FIG. 10 with a wheel in place.

FIG. 10 shows a variation of the embodiment of FIG. 8 according to which one of supporting walls 132 is tapered and the insert 124A is also tapered, so that, instead of requiring several blocks 124, to accommodate several wheel thicknesses, only one tapered board is required and is placed between the wheel 44 and wall 132 at a location that accommodates the thickness of the tire. 44 as shown in FIG. 11.

FIGS. 10 and 11 shows "hook and loop" layers 113, 115 on the block 124A and wall 130 which secure the block in its position between the wheel 44 and wall 132.

FIG. 10 shows legs (blocks) 136 under each corner of the panel construction wherein the dimensions of the block are selected according to the height for supporting the low step above the base 138 support surface.

FIG. 8 also shows ends of a pair of straps 117 attached to the sides 114 of the stand. The other ends (not shown) are attached to the handlebars of the motorcycle and thereby conferred greater stability to the support of the motorcycle.

Figure 12:
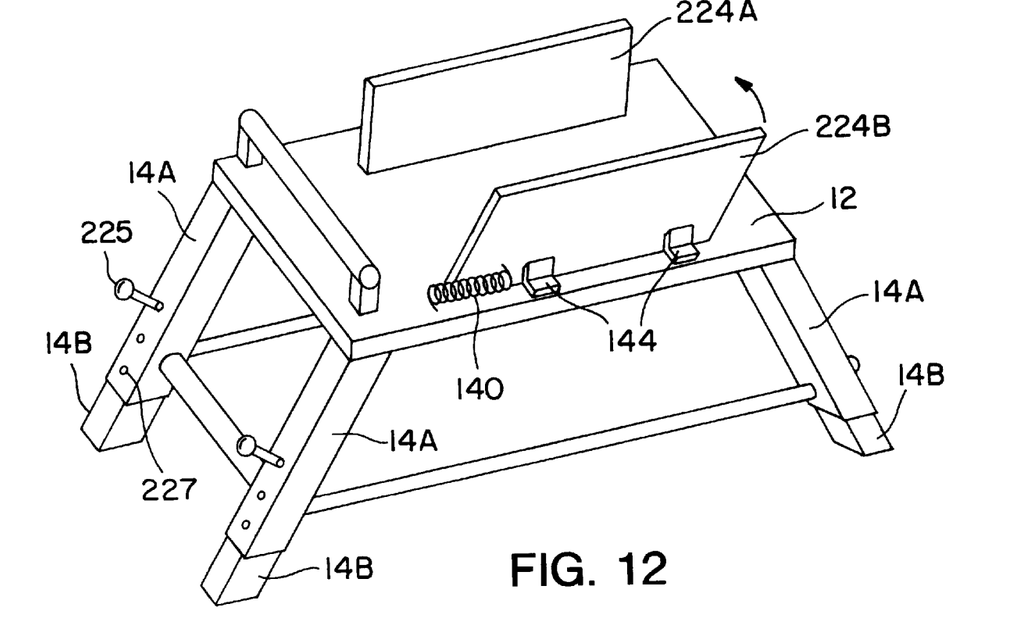
FIG. 12 shows a hinge embodiment of the tire clamp and adjustable legs.

FIG. 12 shows another embodiment in which the clamp is a pair of panels, 224A, and 224B. At least one panel 224B (jaw) is hingably attached by hinges 144 to the top surface of the platform 12 and biased by spring 140 to close toward the other panel (jaw) thereby clamping a wheel when placed between the jaws.

FIG. 12 also shows an embodiment where each leg comprises one section 14A telescoping onto a another sections 14B. The length of each leg is selected by inserting a pin 225 into a selected one of a row of holes 227.

FIG. 12 shows another version of a stop (in place of a stop wall.) being a bar mounted on the edge of the platform.

Figure 13:
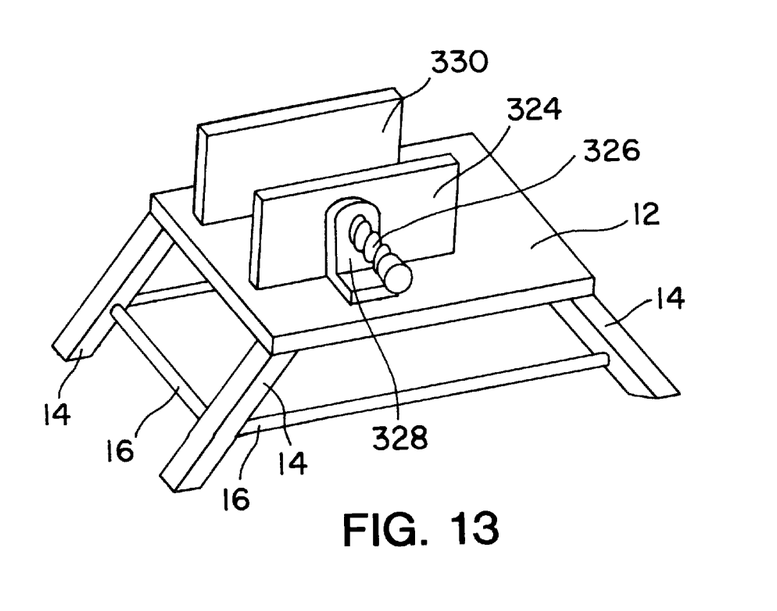
FIG. 13 shows a screw clamp version of the tire clamp.

FIG. 13 shows another version in which one jaw 324 is driven by a threaded rod 326 through a base 328 mounted on the platform 12 toward the other jaw 330.

Figure 14A:
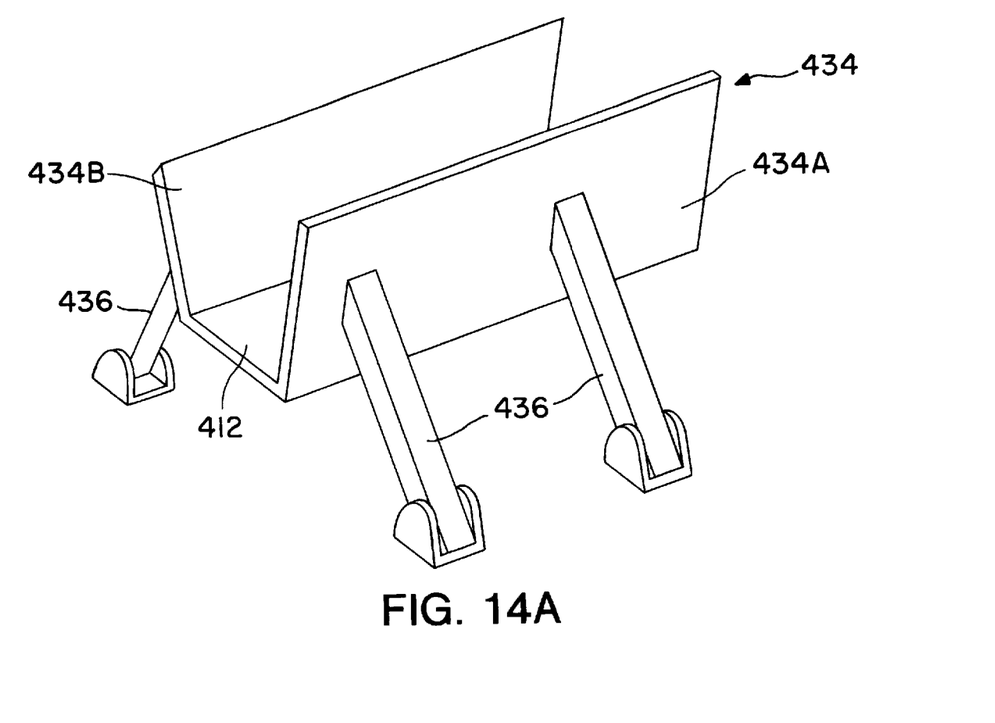
FIGS. 14A and B show a channel version of the tire clamp.
Figure 14B:
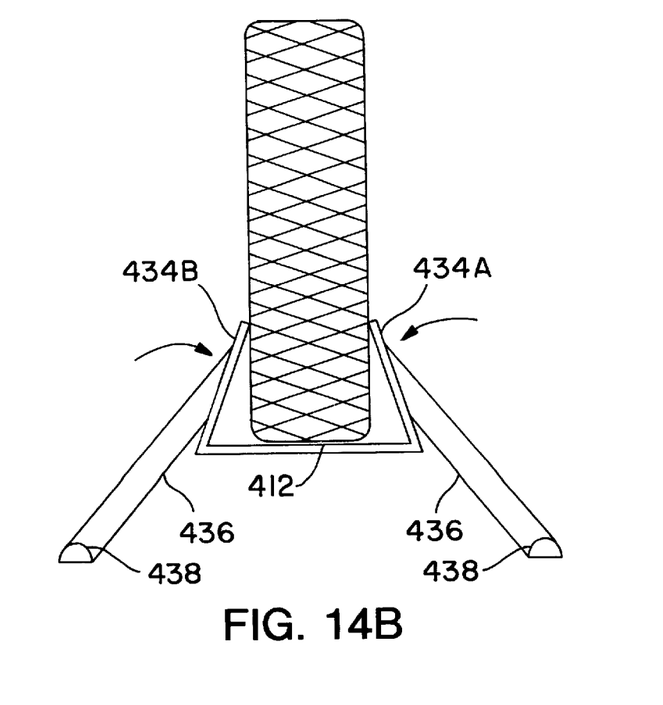

FIGS. 14A and B show an embodiment of the invention including a resilient channel 434 (preferably plastic) having two side walls, 434A and 434B, joined by a platform panel 412. The channel 434 is supported on four legs 436 (preferably steel) which are shown in FIG. 14 to be elongated square tube with feet 438. As illustrated in the end view FIG. 14B showing a wheel 44 positioned on the stand, when a motorcycle is positioned on the stand, the walls 434A and 434B fold toward one another thereby clamping the tire.

There has been described a rack and a method utilizing the rack, constructed according to the invention to support a motorcycle upright in an elevated position such that regions of the motor cycle, for example the crank case, oil reservoir, etc. are readily accessible that are otherwise inconvenient to reach. A particular advantage is that the arrangement is very stable so that making the required repairs may be carried out very safely without the danger that the motorcycle will tip over onto the mechanic. The invention includes a pair of stands wherein a stand is placed under each wheel. At least one of the stands has a clamp for clamping the wheel upright on the stand. Two constructions of the clamp have been described—one being a pair of walls being the panels of angle members each having one panel perpendicular to the platform and another panel member positionably bolted to the platform. In another embodiment, each wall is formed as part of a plastic extrusion with an elongated block forced between the wheel and one block to provide clamping action.

Variations and modifications of the invention may be contemplated after reading the specifications and studying the drawings which are within the scope of the invention.

I therefore wish to define the scope of my invention by the appended claims.

What is claimed is:

1. A rack for supporting a motorcycle at a location where convenient access to parts of the motorcycle between a pair of wheels and under a seat of the motorcycle is provided whereby replacement and servicing of said parts is facilitated, said rack comprising:

a pair of platforms, one platform of said pair of platforms having one support surface for supporting one wheel and another platform of said pair of platforms having another support surface for supporting another wheel of said pair of wheels;

one means for supporting said one platform and another means for supporting said another platform at a distance from a base surface;

a clamp means mounted on one platform having a pair of jaws for securing one of said wheels in an upright orientation;

one jaw of said pair of jaws having a face facing said other jaw and said other jaw of said pair of jaws facing towards and at a space from said one jaw;

means for adjusting said space providing that said one wheel of said motorcycle is clampable between said pair of jaws and said motorcycle is supportable upright on said rack;

a stop for said pair of jaws, said stop secured along an edge of said platform distal from said other platform and positioned to prevent said one wheel positioned between said pair of jaws from rolling toward said stop and off said one platform.

2. The rack of claim 1 wherein said means for supporting comprises at least three legs for each said platform, each leg having one end attached to an opposite surface of said respective platform and said each leg extending away from said opposite surface.

3. The rack of claim 2 wherein each leg of said at least three legs comprises a pair of telescoping sections providing that a length of each said leg is selectable.

4. The rack of claim 1 wherein said another jaw comprises;

an angle member being a pair of panels, one panel of said pair of panels having an edge joined perpendicularly to an edge of another panel of said pair of panels;

said angle brace having said one panel oriented perpendicular to said one support surface and said another panel positioned flush against said one support surface;

said angle brace operably arranged in combination with said support surface to permit sliding said angle brace to a location corresponding to said adjusted space and then securing said angle brace in said location.

5. The rack of claim 1 further comprising lift means for placing said motorcycle on said apparatus with one wheel on one said support surface and another said wheel on another said support surface.

6. The rack of claim 1 wherein said stop is a panel having an edge secured obliquely to said one support surface between and perpendicular to said pair of jaws.

7. The rack of claim 1 wherein said one means for supporting said one platform comprise:

four panels, each panel having a pair of opposite edges, each opposite edge joined to an opposite edge of a neighboring panel whereby an enclosure having four sides is provided; and said clamp means comprises:
a contoured panel, configured to have:
a support section being said one platform,
an attachment section having one edge integral with said support section and another edge integral with an edge of said enclosure;
said attachment section contoured to form a pair of walls and said stop providing that the wheel of said motor cycle is positionable on said support section between said walls and supported in an upright orientation;

an insert dimensioned for snugly positioning between one of said pair of walls and said wheel wherein said clamp is said pair of walls and said insert and provide that said wheel is securable upright between one wall and said insert on said rack.

8. The rack of claim 7 which further comprises four legs, one leg at each corner of said enclosure and supporting said enclosure on an open side of said enclosure opposite said contoured panel.

9. The rack of claim 7 wherein said insert is wood.

10. The rack of claim 7 wherein a surface of said insert interfacing a surface of one of said walls has a covering of one of a hook and eye material and said surface of said wall has a covering of one of eye and hook material providing that said insert is releasably secured against said one wall.

11. The rack of claim 7 wherein said enclosure and said contoured panel are formed of one integral plastic sheet.

12. The rack of claim 11 wherein said plastic is selected from a group of plastics that consists of polypropylene, polyethylene, poly vinyl chloride.

13. The rack of claim 7 wherein said insert is tapered and said pair of walls are inclined to one another in an operable combination that permits placing said insert against one of said pair of walls at a location selected to a width of said wheel to firmly support said wheel in said upright orientation.

14. The rack of claim 1 which further comprises:

a pair of flexible elongated members;

one of said flexible elongated members having one end attached to one handle bar of said motorcycle and another end attached to said to one side of said one of said means for supporting;

another one of said flexible elongated members having one end attached to another handle bar of said motorcycle and another end attached to an opposite side of said one of said means for supporting whereby stability of said motor cycle on said rack is improved.

15. The rack of claim 14 wherein each one of said elongated members is one of a strap and rope.

16. The rack of claim 1 wherein said support surface is located at a distance selected from a range of distances between six and twenty inches.

17. The rack of claim 1 wherein said one means for supporting said one platform and another means for supporting said another platform are adjustable to provide that said distance of said pair of platforms from a base surface is selectable.

18. A rack for supporting a motorcycle at a location where convenient access to parts of the motorcycle between a pair of wheels and under a seat of the motorcycle is provided whereby replacement and servicing of said parts is facilitated, said rack comprising:

four panels, each panel having a pair of opposite edges, each opposite edge integrally joined to an opposite edge of a neighboring panel whereby an enclosure having four sides is provided; and a contoured panel, configured to have:
a support section integrally joined to an attachment section having one edge integral with said support section and another edge integral with an edge of said enclosure;
said attachment section contoured to form a pair of walls and a stop wall operably arranged to enable positioning the wheel of said motorcycle on said support section between said walls and supported in an upright orientation;

a wooden insert dimensioned for snugly positioning between one of said pair of walls and said wheel whereby said wheel is secured upright on said rack;

a surface of said insert interfacing a surface of one of said walls has a covering of one of a hook and eye material and said surface of said wall has a covering of one of eye and hook material providing that said insert is releasably secured against said one wall.

19. The rack of claim 1 wherein one said jaw is a panel secured to an end of a screw threaded into a base, said base secured to said surface of said panel operably arranged to provide that when said screw is turned in a clamping direction, a broad face of said panel is forced toward said other jaw.

20. The rack of claim 1 wherein one said jaw is a panel having one edge hingably attached to said support surface and spring biased to rotate towards said other jaw in an operable arrangement wherein wheel is clampable between said panel and said other jaw.

21. The rack of claim 1 which further comprises means for selecting a distance of said platforms from said base surfaces.

22. The rack of claim 1 wherein said stop is a bar mounted on said support surface of said platform parallel to and proximal to said edge.

23. The rack of claim 1 wherein said one means for supporting said one platform and another means for supporting said another platform are adjustable to provide that said distance of said pair of platforms from a base surface is selectable.

24. The rack of claim 1 wherein
   (i) said one means for supporting said one platform and another means for supporting said another platform at a distance from a base surface; and
   (ii) a clamp means having a pair of jaws for securing a wheel in an upright orientation; and
   (iii) said one jaw of said at least one pair of jaws secured to said one support surface with a face of said one jaw facing sad other wall and another jaw of said pair of jaws mounted on said one support surface and facing towards and at a space from said one jaw; and
   (iv) said means for adjusting said space providing that said one wheel of said motorcycle is clampable between said pair of jaws and said motorcycle is supportable upright on said rack;
   all comprise:
      a channel member having two side panels facing one another and a joining platform panel having a pair of parallel edges, one of said parallel edges joined perpendicularly to an edge of one of said side panels and another one of said parallel edges joined perpendicularly to an edge of another one of said side panel;
      at least four legs, each leg having one end secured to said channel in an operable arrangement to support said channel at a distance from a base surface.

25. The rack of claim 1 wherein
   (i) said one means for supporting said one platform and another means for supporting said another platform at a distance from a base surface; and
   (ii) a clamp means having a pair of jaws for securing a wheel in an upright orientation; and
   (iii) said one jaw of said at least one pair of jaws secured to said one support surface with a face of said one jaw facing sad other wall and another jaw of said pair of jaws mounted on said one support surface and facing towards and at a space from said one jaw; and
   (iv) said means for adjusting said space providing that said one wheel of said motorcycle is clampable between said pair of jaws and said motorcycle is supportable upright on said rack;
   all comprise one of:
      (i) said another jaw having an angle member being a pair of panels, one panel of said pair of panels having an edge joined perpendicularly to an edge of another panel of said pair of panels, and said angle brace having said one panel oriented perpendicular to said one support surface and said another panel positioned flush against said one support surface and said angle brace operably arranged in combination with said support surface to permit sliding said angle brace to a location corresponding to said adjusted space and then securing said angle brace in said location; and
      (ii) four panels, each panel having a pair of opposite edges, each opposite edge joined to an opposite edge of a neighboring panel whereby an enclosure having four sides is provided; and a contoured panel, configured to have: a support section being said one platform, and an attachment section having one edge integral with said support section and another edge integral with an edge of said enclosure and said attachment section contoured to form a pair of walls and said stop providing that the wheel of said motor cycle is positionable on said support section between said walls and supported in an upright orientation, and an insert dimensioned for snugly positioning between one of said pair of walls and said wheel wherein said clamp is said pair of walls and said insert and provide that said wheel is securable upright between one wall and said insert on said rack; and
      (iii) said one said jaw being a panel secured to an end of a screw threaded into a base, said base secured to said surface of said panel operably arranged to provide that when said screw is turned in a clamping direction, a broad face of said panel is forced toward said other jaw; and
      (iv) one said jaw being a panel having one edge hingably attached to said support surface and spring biased to rotate towards said other jaw in an operable arrangement wherein wheel is clampable between said panel and said other jaw;
      (v) a channel member having two side panels facing one another and a joining platform panel having a pair of parallel edges, one of said parallel edges joined perpendicularly to an edge of one of said side panels and another one of said parallel edges joined perpendicularly to an edge of another one of said side panel;
      at least four legs, each leg having one end secured to said channel in an operable arrangement to support said channel at a distance from a base surface.

* * * * *